June 7, 1949.　　　　C. O. BARTHOLDY　　　　2,472,083
MACHINE TOOL FIXTURE
Filed July 3, 1945
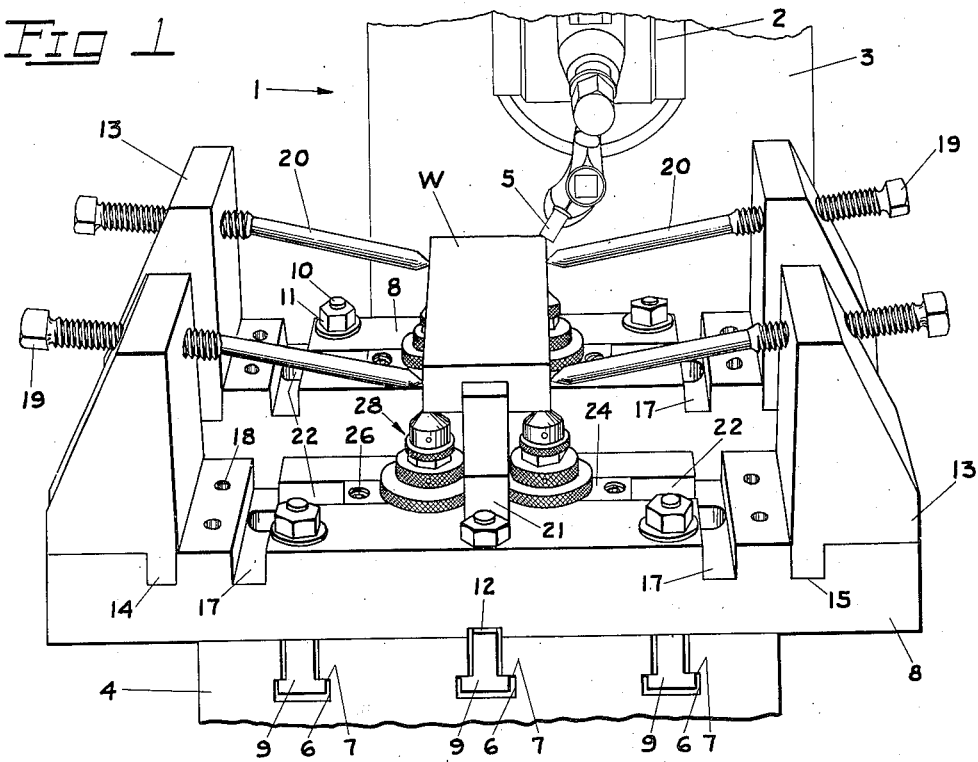
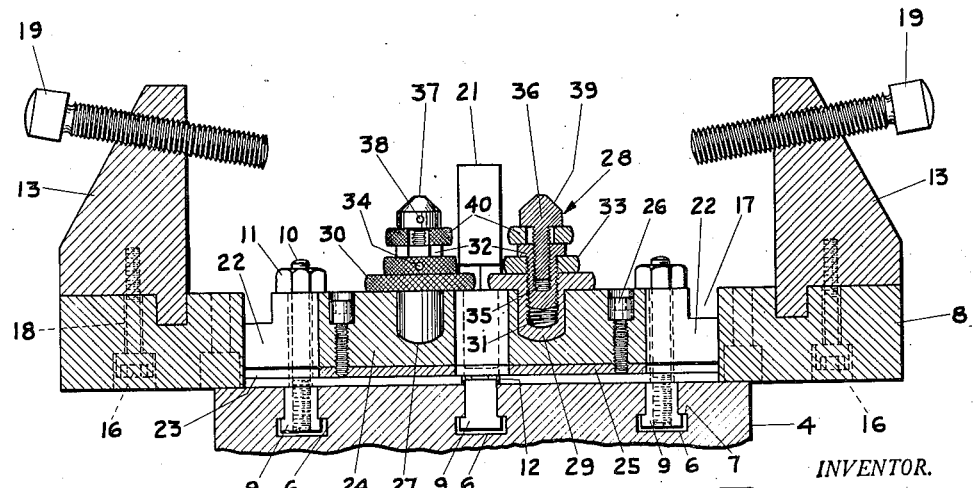
INVENTOR.
CARL O. BARTHOLDY
BY Ralph L. Chappell
ATTORNEY Patented June 7, 1949

2,472,083

UNITED STATES PATENT OFFICE 2,472,083

MACHINE TOOL FIXTURE

Carl O. Bartholdy, San Francisco, Calif.

Application July 3, 1945, Serial No. 603,096

4 Claims. (Cl. 90—60)

(Granted under the act of March 3, 1883, as amended April 30, 1928; 370 O. G. 757)

This invention relates to machine tool fixtures and particularly to fixtures for supporting work in adjusted angular positions.

An object of the invention is to provide an improved fixture for positively supporting work of varying dimensions in various adjusted positions relative to a machine tool so as to facilitate accurate machining of the work.

Other objects of the invention are to provide an improved machine tool fixture having adjustable work-supporting means to permit the positioning of work in various angular relations to a machine tool whereby the work may be machined to the desired dimensions by conventional operation of the machine tool; to provide a machine tool fixture of such construction as to be particularly adaptable for supporting work in the machining of chocks and other tapered wedge members; to provide improved elements and arrangements thereof in a machine tool fixture of the character described and for the purposes set forth; and to accomplish the noted objects in a facile, economical and efficient manner.

In accomplishing these and other objects of the present invention, I have provided improved details of structure, the preferred form of which is illustrated in the accompanying drawing, wherein:

Fig. 1 is a perspective view of a machine tool fixture, embodying the features of the present invention, mounted on the table of a machine tool.

Fig. 2 is a transverse, vertical, sectional view taken through the slot of the forward base plate of the fixture shown in Fig. 1 and in a direction opposite the other base plate.

Referring more in detail to the drawing:

In Fig. 1, the numeral 1 designates a machine tool of the type generally known as a "shaper" which has a horizontal, reciprocating head or carriage 2 slidably mounted upon a support 3. The carriage 2 is adapted to traverse a flat table 4 projecting longitudinally from one end of the machine tool. The carriage 2 includes a cutting element or bit 5 for planing or otherwise shaping a plate or other work W supported upon the table 4, as will be hereinafter more fully explained. A plurality of parallel channels or ways 6 are formed in the upper surface of the table 4 and extend longitudinally thereof in spaced relation. The lower portion of each channel 6 is of increased width so as to provide a pair of overhanging, longitudinal shoulders 7.

A pair of substantially rectangular base plates 8 extend transversely of the table and are adapted to be manually moved relative to each other and longitudinally of said table toward and away from the reciprocating carriage 2. For fastening the base plates 8 to the table while permitting movement of said plates, a plurality of flanged or inverted T-shaped keys 9 depend from the underside of each plate with each key engaging within one of the channels 6. The keys 9 have their flanges disposed within the enlarged lower portions of the channels and are connected to their respective plates by stud bolts 10 and nuts 11. Due to the provision of the overhanging shoulders 7 of the channels, tightening of the nuts 11 upon their bolts 10 draws the keys upwardly into engagement with said shoulders so as to bind said keys and their plates against movement. In order to guide the movement of the plates and prevent lateral movement of the same relative to the table, the central key of each plate is of a length greater than the depth of the center or intermediate channel so as to project above the table and engage within a transverse groove 12 formed in the underside of the plate.

As is clearly shown in Fig. 1, an upright member or block 13 is supported upon each end of each plate 8 and is keyed thereto by means of a rib 14 depending from the inner edge of the block and engaging within a transverse groove 15 formed in the upper surface of the plate. The block 13 is secured to the plate by counter-sunk cap screws 16 which project upwardly through said plate as shown in dotted lines in Fig. 2. To permit inward positioning of the blocks, each plate has a parallel groove 17 spaced inwardly of each groove 15 for receiving the rib 14. Spaced pairs of openings 18 are formed externally of the grooves 15 and 17 to receive the cap screws 16 for fastening the blocks in their adjusted positions. A bolt 19 is screw-threaded through each block at a downward inclination and a pin 20, having a tapered inner end portion, is confined between the bolt and the work W with one end engaging said bolt and its inner end bearing against the lateral margin of said work, whereby lateral displacement of the latter is prevented (Fig. 1.) An upright stop 21 is suitably supported by the base plate spaced the farthest distance from the carriage 2 to maintain the work W in position against endwise or longitudinal movement away from said carriage.

For supporting the work, an elongate, longitudinal opening or slot 22 is formed in each base plate and extends vertically therethrough with its end portions coinciding with the medial portions of the slots 17. The side walls of each slot 22 have co-extensive grooves or recesses 23 formed therein adjacent their lower margins (Fig. 2). A pair of supporting elements or blocks 24, of general rectangular shape, are slidably disposed within each slot and their lower surfaces preferably terminate above the recesses 23. In order to confine the blocks 24 within their respective slots, a flat plate or key 25 slidably engages within the recesses 23 so as to underlie each block and is fastened to the block by a counter-sunk cap screw 26 which is screw-threaded through said block and the key. When tightened, the screw 26 draws the key 25 upwardly so as to bind the same against the overhanging shoulders formed by the recesses 23 and thereby frictionally fasten the block 24 in a fixed position within its slot 22.

A cylindrical well or socket 27 is formed vertically in each block for receiving a supporting element 28 and these supporting elements coact to dispose the work W in the desired angular relation to the carriage 2 and its cutting bit 5. It is preferable for the supporting elements 28 to be vertically adjustable so as to permit fine variations of the angular disposition of the work.

As is clearly shown in Fig. 2, each adjustable supporting element preferably includes a short, cylindrical post or pin 29 having an annular knurled head or flange 30 and an axial, screw-threaded bore 31. The pin 29 snugly engages within the socket 27 of the block 24 and receives a threaded pin or screw 32. An annular, knurled lock nut 33 is carried by the screw 32 for engaging the flange 30 of the pin 29 so as to control the vertical position of said screw. Tightening of the lock nut 33 is preferably accomplished by means of radial openings 34 formed in the exterior of said nut and adapted to receive a suitable tool (not shown). The screw 32 is provided with an axial, screw-threaded bore 35 for receiving a threaded pin or screw 36 which has an enlarged head 37. Radial openings 38, similar to the openings 34 of the nut 33, are formed in the head 37 to permit tightening of the screw 36 and the upper portion of said head is preferably bevelled or tapered as shown by the numeral 39.

A slotted, circular spacer or washer 40, having a knurled periphery, is adapted to be confined upon the screw 36 so as to be clamped between the head 37 of said screw and the head of the screw 32 and thereby control the elevation of said head 37 relative to said screw 32. It is pointed out that the thickness of the washer 40 is subject to variation and that the elevation of the head 37 is adjusted by substituting washers of varying thickness.

*Operation*

The operation of a machine tool fixture constructed as described herein is as follows:

The relation of the base plates 8 to each other and to the carriage 2 of the machine tool 1 is adjusted in accordance with the dimensions of the work W by loosening the nuts 11 of the stud bolts 10 so as to permit movement of the keys 9 within the channels 6 of the table 4. In some instances, such as when the work is relatively small, narrow or exceptionally thick, the blocks 13 may be moved inwardly so as to dispose their depending ribs 14 within the grooves 17 of the base plates instead of the grooves 15 and the pins 20 may be eliminated, whereby the bolts 19 directly engage the lateral margins of said work and confine the same against lateral displacement. However, the pins 20 are more often employed as illustrated in Fig. 1.

After the positioning of the base plates 8, the cap screws 26 are backed off to permit sliding of the blocks 24 within their respective slots 22 so as to dispose the supporting elements 28 beneath the marginal edge portions of the work. The cap screws are then tightened to draw the flat keys 25 upwardly within their recesses 23 and frictionally fasten the blocks in a fixed position. The vertical adjustment of the supporting elements is determined by the desired shape of the finished work and, therefore, is subject to variation. With the supporting elements properly adjusted, the stop 21 is positioned in place to prevent endwise or longitudinal displacement of the work and said work is laterally confined by the bolts 19 and pins 20.

Since the reciprocating carriage 2 traverses the table 4 longitudinally, the cutting bit 5 travels lengthwise of the work so as to plane its upper surface. When it is desired to taper the work, such as in producing a chock or other wedge member, the elevation of the supporting elements is adjusted by substituting washers 40 of varying thickness. An additional adjustment may be obtained by means of the lock nuts 33; however, the washers permit fine variations or tolerances. The elevation of any one or all of the supporting elements may be altered as required so as to dispose the work in the desired angular relationship, whereby the proper taper is obtained by normal reciprocation of the carriage.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A machine tool fixture adapted to be mounted upon the table of a machine tool including, a pair of base plates supported upon the table and extending transversely thereof, the base plates being movable longitudinally of said table and relative to each other, keys carried by said base plates and coacting with the table for guiding and securing the base plates in adjusted positions, each base plate having an elongate longitudinal slot extending vertically therethrough, a pair of blocks slidably mounted within each slot so as to be movable transversely of said table, a key associated with each block and coacting with the slot for confining the block in said slot, means securing each key to its block and being tightened so as to bind the key against movement and fasten said block in adjusted positions, each block having a vertical socket formed therein, a flanged pin engaging within each socket and having an axial bore, a second flanged pin screw-threaded into the bore of the first pin and having an axial bore, a lock nut carried by the second pin and overlying the flange of said first pin for locking said second pin in a vertically-adjusted position, a third pin screw-threaded into the bore of the second pin and having an enlarged head projecting thereabove, a slotted washer engageable upon the third pin and supported upon the flange of said second pin for controlling the vertical projection of the head of said third pin, whereby the elevations of the pair are vertically-adjustable and coact with the pins of the other block to support work in angular relation to the machine tool, a stop carried by the base plate farthest from said machine tool for preventing movement of the work longitudinally of said table away from the machine tool, said base plates having spaced transverse channels formed in their upper surfaces adjacent their longitudinal ends, an upright member overlying and secured to each end of each base plate, the member having a depending rib engaging within one of the channels, a set screw screw-threaded through the upper portion of said member and extending inwardly and downwardly, and a pin having a tapered inner end interposed between the lateral margin of the work and the inner end of the set screw for preventing transverse displacement of said work.

2. A machine tool fixture adapted to be mounted upon the table of a machine tool including, a pair of base plates supported upon the table and extending transversely thereof, the base plates being movable longitudinally of said table and relative to each other, keys carried by said base plates and coacting with the table for guiding and securing the base plates in adjusted positions, each base plate having an elongate longitudinal slot extending vertically therethrough, a pair of blocks slidably mounted within each slot so as to be movable transversely of said table, a key associated with each block and coacting with the slot for confining the block in said slot, means securing each key to its block and being tightened so as to bind the key against movement and fasten said block in an adjusted position, each block having a vertical socket formed therein, a flanged pin engaging within each socket and having an axial bore, a second flanged pin screw-threaded into the bore of the first pin and having an axial bore, a lock nut carried by the second pin and overlying the flange of said first pin for locking said second pin in vertically-adjusted positions, a third pin screw-threaded into the bore of the second pin and having an enlarged head projecting thereabove, a slotted washer engageable upon the third pin and supported upon the flange of said second pin for controlling the vertical projection of the head of said third pin, whereby the elevations of the pins are vertically-adjustable and coact with the pins of the other blocks to support work in angular relation to the machine tool, a stop carried by the base plate farthest from said machine tool for preventing movement of the work longitudinally of said table away from the machine tool, and adjustable means secured to the ends of said base plates and engaging the lateral margins of said work for preventing lateral displacement of the same.

3. A machine tool fixture adapted to be mounted upon the table of a machine tool including, a pair of base plates supported upon the table and extending transversely thereof, the base plates being movable longitudinally of said table and relative to each other, keys carried by said base plates and coacting with the table for guiding and securing the base plates in adjusted positions, each base plate having an elongate longitudinal slot extending vertically therethrough, a pair of blocks slidably mounted within each slot so as to be movable transversely of said table, a key associated with each block and coacting with the slot for confining the block in said slot, means securing each key to its block and being tightened so as to bind the key against movement and fasten said block in an adjusted position, each block having a vertical socket formed therein, a flanged pin engaging within each socket and having an axial bore, a second flanged pin screw-threaded into the bore of the first pin and having an axial bore, a lock nut carried by the second pin and overlying the flange of said first pin for locking said second pin in vertically-adjusted positions, a third pin screw-threaded into the bore of the second pin and having an enlarged head projecting thereabove, a slotted washer engageable upon the third pin and supported upon the flange of said second pin for controlling the vertical projection of the head of said third pin, whereby the elevations of the pins are vertically-adjustable and coact with the pins of the other blocks to support work in angular relation to the machine tool, and means preventing lateral and longitudinal displacement of the work away from said machine tool.

4. A machine tool fixture adapted to be mounted upon the table of a machine tool including, a pair of base plates supported upon the table and extending transversely thereof, the base plates being movable longitudinally of said table and relative to each other, means for guiding the movement of said base plates and securing the same in adjusted positions, a supporting block carried by each base plate and movable longitudinally of the base plate so as to be movable transversely of said table, a plurality of groups of telescoping screw-threaded pins removably carried by the supporting block for supporting work in angular relationship to the machine tool, each of said groups including at least a first adjustable screw-threaded pin and a second pin telescopically screw-threaded within said first pin, spacer means confined upon the pins for controlling the vertical projection of the same, and means preventing displacement of the work away from said machine tool.

CARL O. BARTHOLDY.

REFERENCES CITED

The following references are of record in the file of this patent:

UNITED STATES PATENTS

| Number | Name | Date |
|---|---|---|
| 664,688 | Suess | Dec. 25, 1900 |
| 1,405,492 | Clary et al. | Feb. 7, 1922 |
| 1,674,291 | Malone | June 19, 1928 |
| 1,717,641 | Wells | June 18, 1929 |